Dec. 19, 1967  C. G. SIMONS  3,359,018

PIPE COUPLING

Filed June 24, 1965

INVENTOR.
CLIFFORD G. SIMONS
BY
Andrus & Starke
ATTORNEYS

United States Patent Office 3,359,018
Patented Dec. 19, 1967

3,359,018
PIPE COUPLING
Clifford G. Simons, Delavan, Wis., assignor to Sta-Rite Industries, Inc., Delavan, Wis., a corporation of Wisconsin
Filed June 24, 1965, Ser. No. 466,614
2 Claims. (Cl. 285—367)

ABSTRACT OF THE DISCLOSURE

The invention relates to a coupling for joining pipe sections adapted to convey milk or other food products. The end of each pipe section is provided with an external tapered surface and the adjacent ends of the pipe to be coupled are separated by a resilient gasket. To join the pipe sections, a coupling member is located around the ends of the pipe sections and the coupling member is provided with an internal groove which receives the outer peripheral edge of the gasket. In addition, the side edges of the coupling member, located on either side of the groove, engage the respective tapered surfaces on the pipe section in a substantial line contact. By contracting the coupling member inwardly by means of a clamping band located in a recess formed in the outer surface of the coupling member, the side edges of the coupling member bear inwardly on the tapered surfaces and, by a wedging action, force the pipe sections axially toward each other to compress the seal located between the ends of the pipe sections.

---

This invention relates to a pipe coupling and more particularly to a coupling for joining sanitary pipe sections adapted to handle food products and the like.

The pipe coupling of the invention is used for joining glass or stainless steel sanitary pipe sections which are adapted to convey milk or other food products. According to the invention, the end of each pipe section is provided with an outwardly tapered or inclined surface and the adjacent ends of the pipe sections to be coupled are separated by a resilient gasket. To join the pipe sections, a coupling member is located around the ends of the abutting pipe sections and the coupling member is provided with an internal groove which receives the outer peripheral edge of the gasket. In addition, the coupling member is provided with a pair of annular side edges, located on either side of the groove, which are in engagement with the respective tapered external surfaces on the pipe sections.

The coupling member is adapted to be contracted inwardly by a clamping band which is located in a recess formed in the outer surface. When the clamping band is tightened, the side edges of the coupling member bear inwardly on the tapered surfaces and, by a wedging action, force the pipe sections axially toward each other to compress the seal located between the ends of the pipe sections.

The coupling of the invention provides a very effective seal for the pipe joint in which the sealing action is derived from the axial movement of the pipe sections which compresses the seal or gasket located between the ends of the pipe sections. In addition, the gasket is self-centering which insures that the inner surface of the gasket will be flush with the interior surfaces of the pipe sections and this eliminates the possibility of any cracks or crevices in which foreign particles may lodge.

The coupling of the invention is of simple construction having only a few parts which is an improvement over conventional coupling devices of this type which normally require a substantial number of parts.

The rubber gasket which is compressed between the abutting ends of the pipe sections has sufficient resiliency so that the pipeline can expand when washing water, having a temperature up to 180° F., is run through the line, and similarly, the gasket will maintain a tight seal when the pipeline is conveying milk during the winter at which time the temperature may drop to as low as 20° F.

Other objects and advantages will appear in the course of the following description.

The drawings illustrate the best modes presently contemplated of carrying out the invention.

Figure 1:
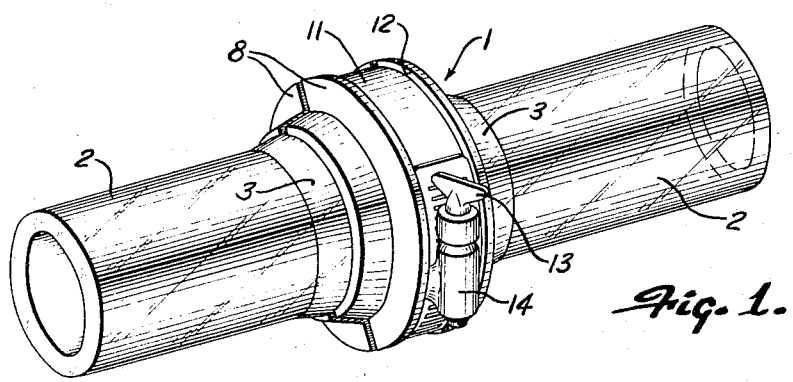
FIG. 1 is a perspective view showing the coupling of the invention as attached to a pair of pipe sections.

The drawings illustrate a coupling 1 designed to attach a pair of pipe sections 2 in an end-to-end relation. The coupling is designed particularly for sanitary pipelines constructed of stainless steel, glass or the like, which are used for handling milk or other food products. As shown in the drawings, the pipe sections 2 are formed of glass and as such have particular use in a milk pipeline.

Figure 2:
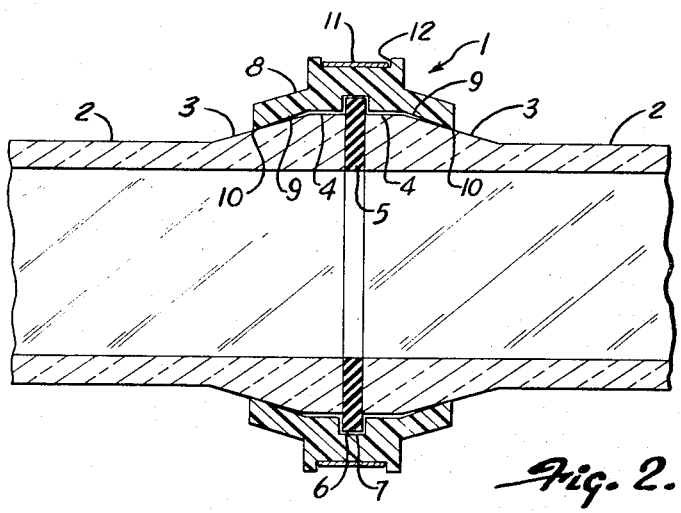
FIG. 2 is a longitudinal section taken through the pipe sections.
Figure 3:
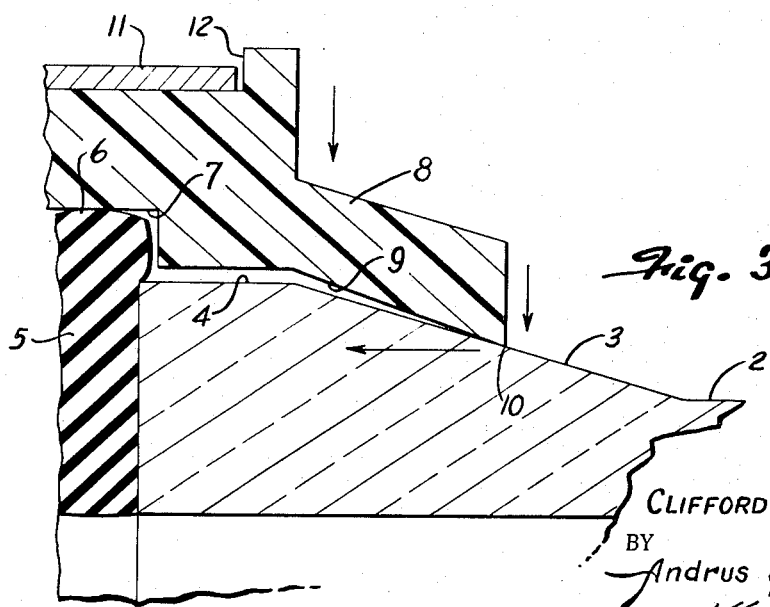
FIG. 3 is an enlarged fragmentary longitudinal section showing the details of the coupling structure in the coupled position.

Each pipe section 2 is provided with an external inclined surface 3 which terminates in an end portion 4 having a substantially greater external diameter than the body of the pipe section. A rubber or resilient annular gasket 5 is located between the adjacent ends of the pipe sections 2 and serves to seal the joint between the pipe sections. As best shown in FIGS. 2 and 3, the inner edge of the gasket 5 is substantially flush with the interior surfaces of the pipe sections, while the outer edge 6 of the gasket projects outwardly beyond the end portions 4 of the pipe sections 2 and is received within a groove 7 formed in a pair of coupling halves 8.

The coupling halves 8 each extend approximately 180° around the pipe sections and it is contemplated that rather than a pair of coupling halves, three or more coupling elements can be used in the same manner. Similarly, while the drawings illustrate the coupling halves 8 as being separate members, a hinged or split coupling member can also be substituted.

As best shown in FIG. 3, the internal surface of each coupling member 8 is provided with a pair of inclined surfaces 9 which terminate in an annular edge 10. Each edge 10 is adapted to bear against the corresponding inclined surface 3 of the pipe section 2 and as the coupling members 8 are moved radially inward, the edges 10 will bear inwardly against the surfaces 3 to thereby move the pipe sections axially toward each other by a wedging action to compress the gasket or seal 5.

To move the coupling members 8 radially inward, a clamping band 11 is located in an annular groove 12 formed in the outer surface of the members 8. The clamping band 11 is a conventional type which is adapted to be tightened within the groove 12 by the thumb screw 13 which is engaged with the nut 14.

By tightening the thumb screw 13, the clamping band 11 is reduced in diameter thereby contracting the coupling members 8. This forces the annular edges 10 downwardly along the inclined surfaces 3 of the pipe sections and by a wedging action moves each pipe section 2 axially toward the other to compress the annular seal 5 between the ends of the pipe section as shown in FIG. 3.

The coupling of the invention provides an effective seal for the joint between the ends of the pipe sections and is particularly adaptable for use with glass pipeline, such as used in a milking operation. The coupling includes only three elements, the seal, the coupling halves 8 and the clamping band 11 and this constitutes a substantial reduction in the number of parts compared to the conventional seal for a glass pipeline. By reducing the number of parts, the overall cost of the coupling is substantially reduced.

Gasket 5, which is compressed between the ends of the pipe sections, provides resiliency so that the pipeline can expand when hot fluids up to 180° are passed through the pipeline. Similarly, the resiliency of the gasket 5 will take up any contraction of the pipe sections when cold liquids are conducted through the pipeline.

The gasket 5 is self-centering so that the inner annular edge of the gasket will be substantially flush with the interior surface of the pipe sections. Moreover, the clamping halves 8 are not intended, in themselves, to bear against the gasket and compress the gasket, for initially there is a clearance between the outer periphery of the gasket 5 and the bottom of the groove 7. The sealing effect is provided by the wedging action which moves the pipe sections axially and compresses the seal 5 between the ends of the pipe sections.

Various modes of carrying out the invention are contemplated as being within the scope of the following claims particularly pointing out and distinctly claiming the subject matter which is regarded as the invention.

I claim:

1. A pipe coupling, comprising a pair of pipe sections disposed in confronting end-to-end relation, each pipe section having an annular tapered external surface located adjacent the confronting end, a generally flat annular seal located between the confronting ends of the pipe sections with the inner edge of the seal being substantially flush with the internal surfaces of the pipe sections and the outer edge of the seal projecting beyond the outer surfaces of said pipe sections, an expandable coupling member disposed around the pipe sections and having an internal groove to receive the projecting outer edge of the seal, the axial width of said groove being slightly larger than the thickness of said seal, said coupling member having a pair of annular edge extremities straddling the groove and disposed in engagement with the respective tapered surfaces on said pipe sections along a substantial line contact, and clamping means disposed around the coupling member and disposed to contact the coupling member and force the annular edges inwardly against the tapered surfaces to thereby move the pipe sections axially toward each other to compress the seal between said confronting ends by a wedging action whereby the outer periphery of the seal engages the bottom of said groove and centers the seal with respect to the pipe sections.

2. A pipe coupling, comprising a pair of pipe sections disposed in confronting end-to-end relation, each pipe section having an annular tapered external surface located adjacent the confronting end, a generally flat disc-like annular seal located between the confronting ends of the pipe sections with the inner edge of the seal being substantially flush with the internal surfaces of the pipe sections and the outer edge of the seal projecting beyond the outer surfaces of said pipe sections, an expandable coupling member disposed around the pipe sections and having an internal groove to receive the projecting outer edge of the seal, the axial width of said groove being slightly larger than the thickness of said seal, said coupling member having a pair of annular edge extremities straddling the groove and disposed in engagement with the respective tapered surfaces on said pipe sections along a substantial line contact, the outer surface of said coupling member being provided with an annular recess disposed in radial alignment with the groove, a clamping band disposed in the recess and adapted to clamp the coupling member against the pipe section with the projecting outer edge of the seal disposed to engage the bottom of the groove to center said seal with respect to said pipe sections and said annular edges being forced against the respective tapered surfaces on the pipe sections to thereby move the pipe sections axially toward each other to compress the seal therebetween by a wedging action.

References Cited

UNITED STATES PATENTS

| 2,460,984 | 2/1949 | Hill et al. | 285—367 X |
| 3,084,959 | 4/1963 | Stanton. | |
| 3,186,428 | 6/1965 | Bender. | |
| 3,231,298 | 1/1966 | Tomb et al. | 285—367 |
| 3,235,293 | 2/1966 | Condon | 285—367 X |

FOREIGN PATENTS

| 649,600 | 9/1928 | France. |
| 1,380,373 | 10/1964 | France. |

CARL W. TOMLIN, *Primary Examiner.*

THOMAS F. CALLAGHAN, *Examiner.*